(12) United States Patent
Thomas

(10) Patent No.: US 11,032,485 B2
(45) Date of Patent: *Jun. 8, 2021

(54) OPTICAL ASSEMBLY FOR SUPERIMPOSING IMAGES FROM TWO OR MORE SOURCES

(71) Applicant: Maranon, Inc., Eagle Rock, VA (US)

(72) Inventor: Nils I. Thomas, Eagle Rock, VA (US)

(73) Assignee: Maranon, Inc., Eagle Rock, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,644

(22) Filed: Mar. 3, 2020

(65) Prior Publication Data

US 2020/0259990 A1    Aug. 13, 2020

Related U.S. Application Data

(63) Continuation of application No. 14/961,377, filed on Dec. 7, 2015, now Pat. No. 10,582,133.

(60) Provisional application No. 62/089,326, filed on Dec. 9, 2014.

(51) Int. Cl.
*H04N 5/235* (2006.01)
*H04N 5/33* (2006.01)
*H04N 5/232* (2006.01)
*G06F 3/01* (2006.01)
(Continued)

(52) U.S. Cl.
CPC ....... *H04N 5/2355* (2013.01); *G02B 27/0101* (2013.01); *G02B 27/4205* (2013.01); *G06F 3/011* (2013.01); *H04N 5/23293* (2013.01); *H04N 5/33* (2013.01); *G02B 2027/013* (2013.01); *G02B 2027/0118* (2013.01); *G02B 2027/0138* (2013.01)

(58) Field of Classification Search
CPC .......................... H04N 5/2355; G02B 27/0101
See application file for complete search history.

(56) References Cited

U.S. PATENT DOCUMENTS

| 4,000,419 | A | * | 12/1976 | Crost ..................... G02B 23/10 250/214 VT |
| 4,961,626 | A | * | 10/1990 | Fournier, Jr. .......... A42B 3/042 345/8 |
| 5,880,888 | A | | 3/1999 | Schoenmakers |

(Continued)

*Primary Examiner* — Mainul Hasan
(74) *Attorney, Agent, or Firm* — Elizabeth L. Neal; Charles S. Sara; DeWitt LLP

(57) ABSTRACT

An optical assembly allows video imagery to be imported into a night vision device and exported therefrom. The assembly can be an insert that is installed between the image tube and eyepiece of an existing night vision device to retrofit the device for superimposing images. Images imported—e.g., images captured by thermal detectors, maps, compass information, training video, etc.—are received wirelessly and injected into the optical train of the night vision device such that both the night vision scene from the goggle and the injected imagery can be simultaneously observed at the eyepiece. Combined images can be transmitted to external systems for observation purposes such as real-time active mission feedback. The insert provides sensor fusion and interconnection to the digital battlefield for presently-fielded night vision goggles. It receives power and optical information from the existing goggle. Goggles using this device can have full functionality and performance.

20 Claims, 14 Drawing Sheets

(51) Int. Cl.
 *G02B 27/42* (2006.01)
 *G02B 27/01* (2006.01)

(56) References Cited

U.S. PATENT DOCUMENTS

| | | | |
|---|---|---|---|
| 6,061,182 A * | 5/2000 | Carmeli | G02B 27/0172 |
| | | | 359/629 |
| 6,195,206 B1 * | 2/2001 | Yona | G02B 23/125 |
| | | | 359/630 |
| 6,342,872 B1 | 1/2002 | Potin | |
| 6,467,914 B1 | 10/2002 | Cohen et al. | |
| 6,560,029 B1 * | 5/2003 | Dobbie | G02B 23/125 |
| | | | 2/6.1 |
| 7,211,778 B1 | 5/2007 | Smith et al. | |
| 7,541,581 B2 | 6/2009 | Reed et al. | |
| 7,755,047 B2 | 7/2010 | Reed et al. | |
| 7,842,921 B2 | 11/2010 | Reed et al. | |
| 9,069,172 B1 * | 6/2015 | Morley | G02B 23/12 |
| 9,244,275 B1 * | 1/2016 | Li | G02B 5/0252 |
| 9,426,389 B1 * | 8/2016 | Hornback | G01J 5/0265 |
| 10,582,133 B1 * | 3/2020 | Thomas | G02B 27/4205 |
| 2004/0042086 A1 * | 3/2004 | Beystrum | G02B 27/01 |
| | | | 359/629 |
| 2006/0164718 A1 * | 7/2006 | Tai | G02B 23/12 |
| | | | 359/353 |
| 2007/0084985 A1 | 4/2007 | Smith | |
| 2010/0128135 A1 | 5/2010 | Filipovich et al. | |
| 2016/0116736 A1 * | 4/2016 | Andersson | G03B 21/206 |
| | | | 353/13 |
| 2016/0131904 A1 | 5/2016 | Border | |

* cited by examiner

FIGURE 1 – Prior Art

OPTICAL ASSEMBLY FOR SUPERIMPOSING IMAGES FROM TWO OR MORE SOURCES

CROSS-REFERENCE TO RELATED APPLICATIONS

This application is a continuation of U.S. application Ser. No. 14/961,377, filed Dec. 17, 2015, which application claims priority under 35 USC § 119(e) to U.S. Provisional Patent Application 62/089,326 filed Dec. 9, 2014, the content of which is incorporated herein by reference in their entireties.

FIELD OF THE INVENTION

This document concerns an invention relating generally to superimposing images from two or more sources, and more specifically to systems and methods for importation of video imagery into optoelectronic devices (such as night vision goggles) for superimposition of imported imagery with imagery of the optoelectronic devices, and exportation of superimposed images to other devices.

BACKGROUND OF THE INVENTION

Night vision goggles enhance the ability of users to see in low-light conditions. It is often useful to inject additional imagery into images of a night vision goggle to provide the user with more information. This allows the user to simultaneously view the night vision images along with the imported imagery. The imported video imagery can be imagery from thermal detectors, commonly called thermal cameras, or other imagery such as a map, compass, training video, etc. Such a system that contains night vision imagery along with injected imagery is often called a "fused" system.

Referring initially to FIG. 1, a prior art fused system 10 includes a night vision goggle (with an image intensifier ("I2") channel) 12 and a clip-on thermal imager (with a thermal channel) 14. The image intensifier ("I2") channel 12 consists of an objective lens 16 for collecting light from the night vision scene 18, an image intensifier tube 20 for the detection, amplification, and redisplay of the night vision scene 18 for an observer 20, and an eyepiece lens 22 for optical collimation of the redisplayed image so the eye can properly focus. The thermal channel 14 consists of a thermal lens 24, thermal detector 26, electronics 28, and a means of injecting or importing the thermal imagery into the objective path of the image intensifier channel (discussed below). This approach is discussed in U.S. Pat. Nos. 7,842,921, 7,755,047, and 7,541,581. For simplicity the lenses are shown as a simple lens element but it should be understood that the lenses are composed of several elements. The I2 tube 20 includes a tube light emitting surface 21, and is encapsulated in a plastic or aluminum housing 40. The whole assembly is commonly called a night vision goggle, or goggle for short. The human observer 20 views the image intensifier through the eyepiece.

The thermal channel 14 is an independent assembly which is mechanically mounted (using clip-ons or clamps) externally to the I2 goggle 12 and feeds an image into the objective of the I2 goggle 12. The thermal channel 14 has its own optics and power sources. It consists of the thermal objective lens 24 for collecting the thermal imagery from a thermal scene 19, the thermal detector 26 for detection and conversion to an electronic image, and electronics 28 for converting the electronic image into either digital or analog video. A hard wire link 42 sends the video to a display 44 via a flex circuit and other electrical hardware, where the electronic image is converted to a light image that can be observed. The thermal image is imported or injected into the I2 channel 12 via cable 46. Thus the thermal image and the night vision image are simultaneously imaged onto the I2 tube 20. The I2 tube 20 then amplifies both the injected image and the night vision image together and displays them on the output of the tube 20 through the eyepiece 22.

This approach suffers from multiple shortcomings. First, the thermal channel imagery has the same green color as the I2 imagery. Ideally, a viewer can distinguish targets in the I2 and thermal channels by having a color contrast, or differences in brightness and resolution between the two images. Because the color in the two channels is identical, a person has to rely on brightness and resolution to distinguish targets in the two channels. But if the brightness of the two channels is nearly equal, then the thermal channel may not be distinguished and targets missed. Second, the thermal brightness is determined by the tube gain. As the night vision scene becomes brighter, automatic brightness control circuitry of the image intensifier starts reducing the tube gain and thus thermal brightness contrast is again reduced. To overcome this weakness manual brightness adjustment can be added to the thermal display. But manual brightness adjustment would not be practical, as many mission scenarios have rapid scene brightness changes and the soldier using the goggle does not need the distraction of constantly adjusting the thermal channel brightness. Third, this method cannot provide export of the image intensified image. That is only possible by gathering the imagery from the output of the tube. Export of the I2 imagery is sometimes desirable to allow (for example) recording of video from a mission for training purposes. What is needed is an approach that overcomes these and other shortcomings of traditional approaches.

SUMMARY OF THE INVENTION

The invention, which is defined by the claims set forth at the end of this document, is directed to optical assemblies for superimposing images from two or more sources which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

This invention relates to a new approach for importing video imagery into a night vision device (or other optoelectronic device) and/or exporting imagery from the night vision device. The night vision device may be a binocular system such as the ANVIS goggle worn by aviators for pilotage at night, or a monocular such as the AN/PVS-14 goggle worn by infantry men for terrain or building navigation and short range enemy engagement, or rifle sights for longer range enemy engagement. Imagery is inserted into the optical train of the goggle such that both the night vision scene from the goggle and the injected imagery can be simultaneously observed. The combined imagery of the night vision scene can be transmitted to external systems for observation purposes, such as active mission feedback.

Referring to FIGS. 2 and 3, an exemplary optical assembly 100 and method for superimposing/combining images from at least two image sources includes a non-contact receiver 102 for wirelessly receiving a first image (generated externally), and a display 104 for displaying the first image. The assembly 100 can be positioned between an eyepiece 108 and an image tube 110 of an optoelectronic device 112 (such as a night-vision goggle). The display 104 (and its resultant image) is at 90 degrees with respect to the tube image plane. A 45-degree semi-transparent (i.e., partially reflective, partially transmissive) mirror 106 is positioned to intercept light from the display 104, allowing some of the light to pass therethrough and some of the light to reflect there off. Some light from the display 104 (which displays the first image) hits a mirror first side 116 and is reflected into the optical path of the eyepiece 108. Some light from a second image (generated internally, passing through objective lens 109 and image tube 110) approaches the mirror 106 from a mirror second side 120 and is transmitted through the mirror 106 to reach the eyepiece 108. The first image is superimposed on the second image for viewing at the eyepiece 108. Optionally, a camera 122 can be included to capture the combination of transmitted light from the first image (hitting the mirror first side 116 and passing therethrough) and reflected light from the second image (hitting the mirror second side 120 and reflecting into the optical path of the camera 122). The combined image captured by the camera 122 can be wirelessly sent via a camera transmitter 127 to a camera receiver 128, which can send to a transmitter 129 for transmission of the combined image as captured by the camera 122 to another device.

The display 104 and fold mirror 106 are positioned such that a display-to-eyepiece portion 114 of the first image hits the mirror first side 116 and is reflected to the eyepiece 108, and a tube-to-eyepiece portion 118 of the second image hits the (opposing) mirror second side 120 and passes through the mirror 106 to reach the eyepiece 108. The camera 122 is positioned in the optical assembly 100 such that a display-to-camera portion 115 of the first image hits the mirror first side 116 and passes through the mirror 106 to reach the camera 122, and a tube-to-camera portion 126 of the second image hits the mirror second side 120 and is reflected to the camera 122. The camera 122, which includes a camera lens 125 and a camera sensor 131, is thus positioned to receive a superimposition of light from the display 104 that passes through the mirror 106, and light from the image tube 110 that reflects off the mirror 106. The transmitter 129 allows wireless transmission of images out of the goggle. A brightness detector 130 is preferably included to allow the adjustment of brightness level of the display 104 depending on the brightness of the image from the tube 110 in case one image would overwhelm the other. The brightness detector 130 allows for the automatic adjustment of brightness level via electronic circuitry or software.

It is noted that the light rays 114, 115, 118, 126 are intended to be illustrative representations of the paths of light that are reflected and transmitted from the display 104 and the tube 110. The line style indicates the source of the light, such that matching line styles are from the same source; here, the lines with the finer dots (114, 115) are from the display 104, and the lines with the longer dots (118, 126) are from the tube 110. Analogously, the arrowheads represent which images are superimposed, such that matching arrowheads indicate the lines that are superimposed. Here, the chevron arrowheads (114, 118) are associated with the images that are superimposed at the eyepiece 108, and the solidly triangular arrowheads (115, 126) are associated with the images superimposed at the camera 122.

The optical assembly 100 can be a separate module ("insert") that is installable in an existing goggle (such as a night vision goggle or other optoelectronic device) when inserted between its image tube 110 and eyepiece 108 to retrofit the goggle. In such a retrofitted goggle, the first image would be received via the non-contact receiver 102, and the second image would be generated by the goggle itself. Preferably, retrofit versions of the insert 100 (i.e., versions configured to be installed in an existing goggle) include a power interface that allows the optical assembly 100 to receive power from the goggle in which the insert 100 is retrofitted. This can eliminate the need to include a separate power source for primary power, helping save space, weight, and costs. Retrofitting the insert 100 in the goggle generally involves removal of the eyepiece 108 from the goggle, insertion of the insert 100 between the image tube 110 and the eyepiece 108, and replacement of the eyepiece 108 on the goggle (see also FIG. 14, further discussed below). Rather than being a separate module for retrofitting, the optical assembly 100 can also be an integral part of an optoelectronic device which captures images using an (internal) image source (housed by the optoelectronic device itself). The integral optoelectronic device is able to receive images from a separate (external) image source (such as another optoelectronic device) and combine images from the two image sources for viewing at the eyepiece.

Exemplary versions of the present invention can: (i) provide a truly retrofittable solution for previously-fielded optoelectronic devices so that fused imagery may be applied to systems already in use with no or minimal modifications either optically, mechanically, or electrically; (ii) provide color imagery if desired; and (iii) provide for the export of imagery. The optical assembly can be disposed against the already existing tube in the existing space between the tube and eyepiece of the optoelectronic device. For convenience, the optical assembly will be referred to as "insert assembly" or simply "insert"; the optoelectronic device housing the optical assembly will be referred to as the "internal image source," "primary image source," "night vision channel," "night vision device," "night vision goggle," or simply "goggle," and the imagery generated/captured by the goggle will be referred to as the "primary image," "internal image," "goggle image," or "night vision scene." The external source of imagery (i.e., the optoelectronic or other device capturing or generating images to be imported by the insert, injected into the optical path of the goggle, and superimposed with the google image) will for the sake of convenience be referred to as the "secondary image source," "external image source," "thermal detector," "thermal channel," "thermal imager," or "thermal camera." These terms are used only for convenience and are not intended to limit the scope, functionality, or applicability of exemplary versions of the devices discussed herein. For example, the thermal detector is only one example of an external image source that can be used to augment the imagery of goggles. The optical wavelength for the second source is generic and could be, for example, a second intensifier channel, such as a weapon sight or a short-wave infrared camera.

The exemplary versions of the insert 100 depicted in FIGS. 2 and 3 include a fold mirror with a notch filter, a display, a camera, a projection lens, a non-contact wireless receiver—which serves as a non-invasive means of communication in and out of the goggle (or other optoelectronic device)—circuit cards, mechanical members for retaining the assembly in the goggle, a photo-sensor for measuring the tube brightness, and a flex cable for obtaining electrical power from the existing goggle system. Retrofitability to existing goggles is particularly enhanced by the non-invasive means of communication, the method of obtaining power from the goggle, and the mechanical ability to fit in existing goggles. The mechanical means of insertion will also provide the basic mechanics to rough-align the display to the tube, but final alignment can be left under the control of the user. When assembled in an existing goggle, the insert provides the means of communication with a thermal channel that can be clipped on to allow (for example) the thermal detector to generate imagery of the same area that is being imaged by the night vision channel. A communications adaptor can be clipped on for picking up the camera signal from the thermal detector, or entirely wireless communication with an external camera processing unit can be implemented. Color imagery and export imagery can be accomplished by the fold mirror into the eyepiece section of the I2 optical channel.

Further advantages and features of the invention will be apparent from the remainder of this document in conjunction with the associated drawings.

DETAILED DESCRIPTION OF PREFERRED VERSIONS OF THE INVENTION

Figure 1:
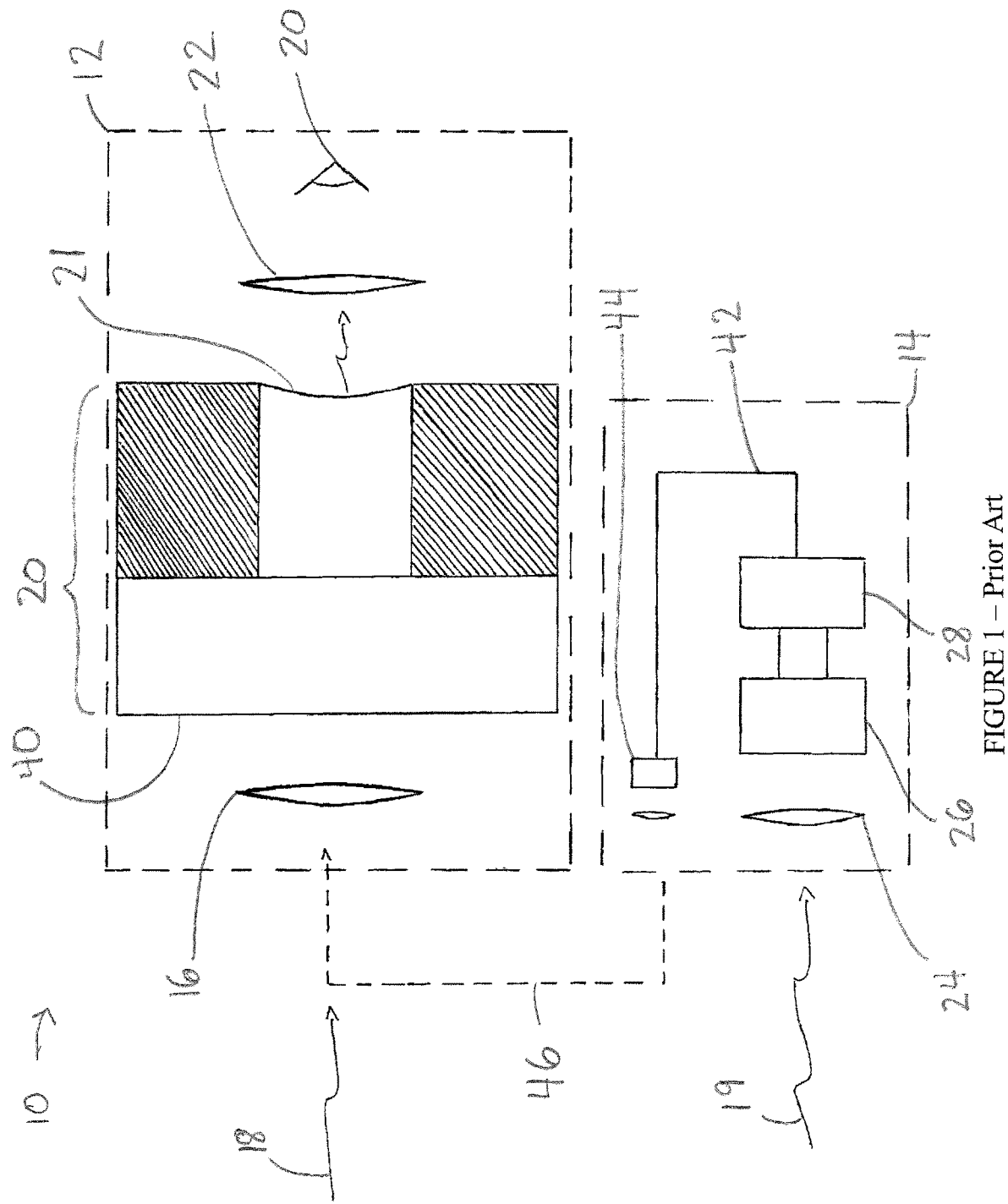
FIG. 1 shows a prior art clip-on thermal device which uses a cable to feed images to the objective lens of a night vision goggle.
Figure 2:
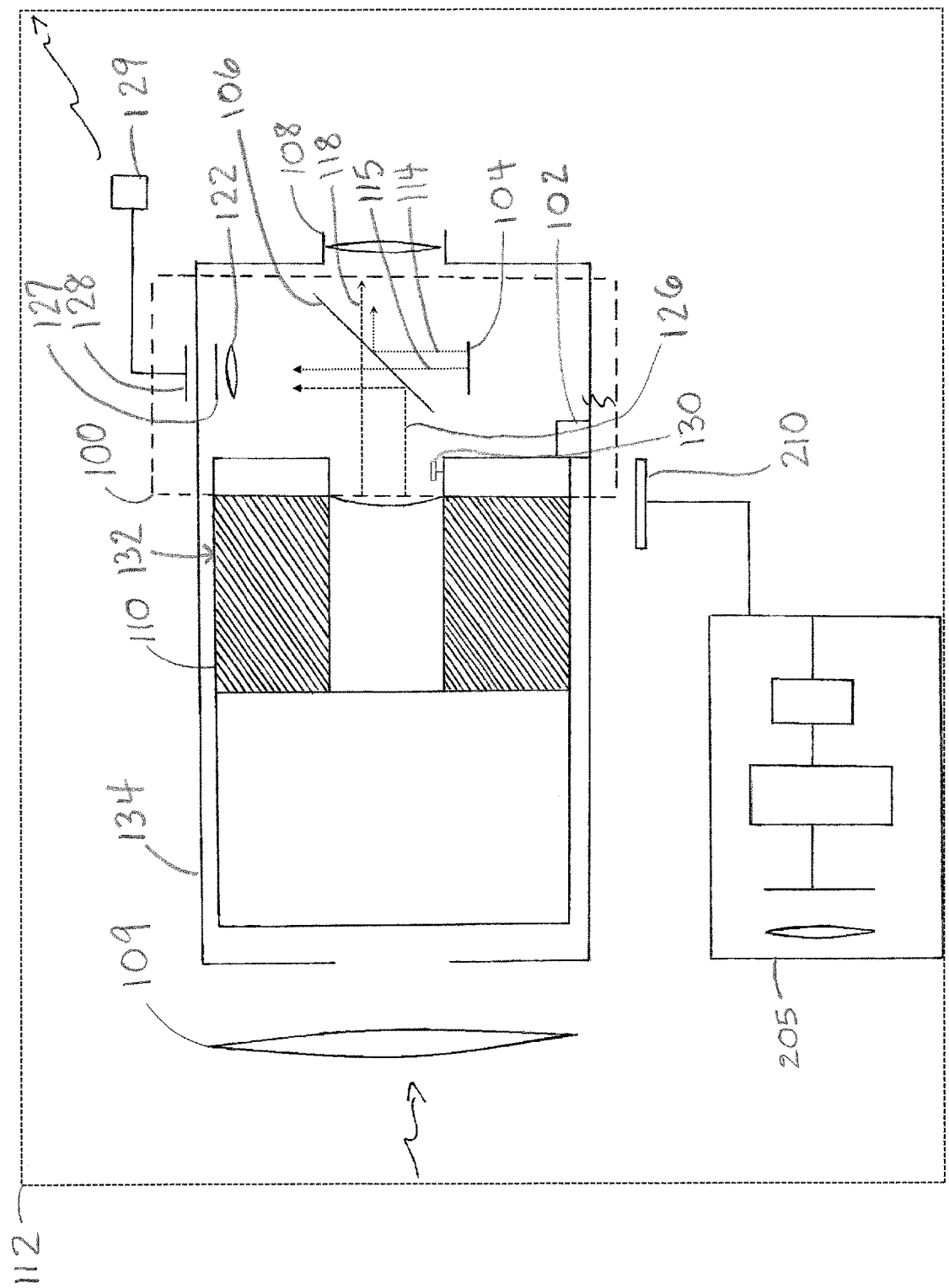
FIG. 2 represents an optoelectronic device retrofitted with an exemplary optical assembly ("insert").
Figure 14:
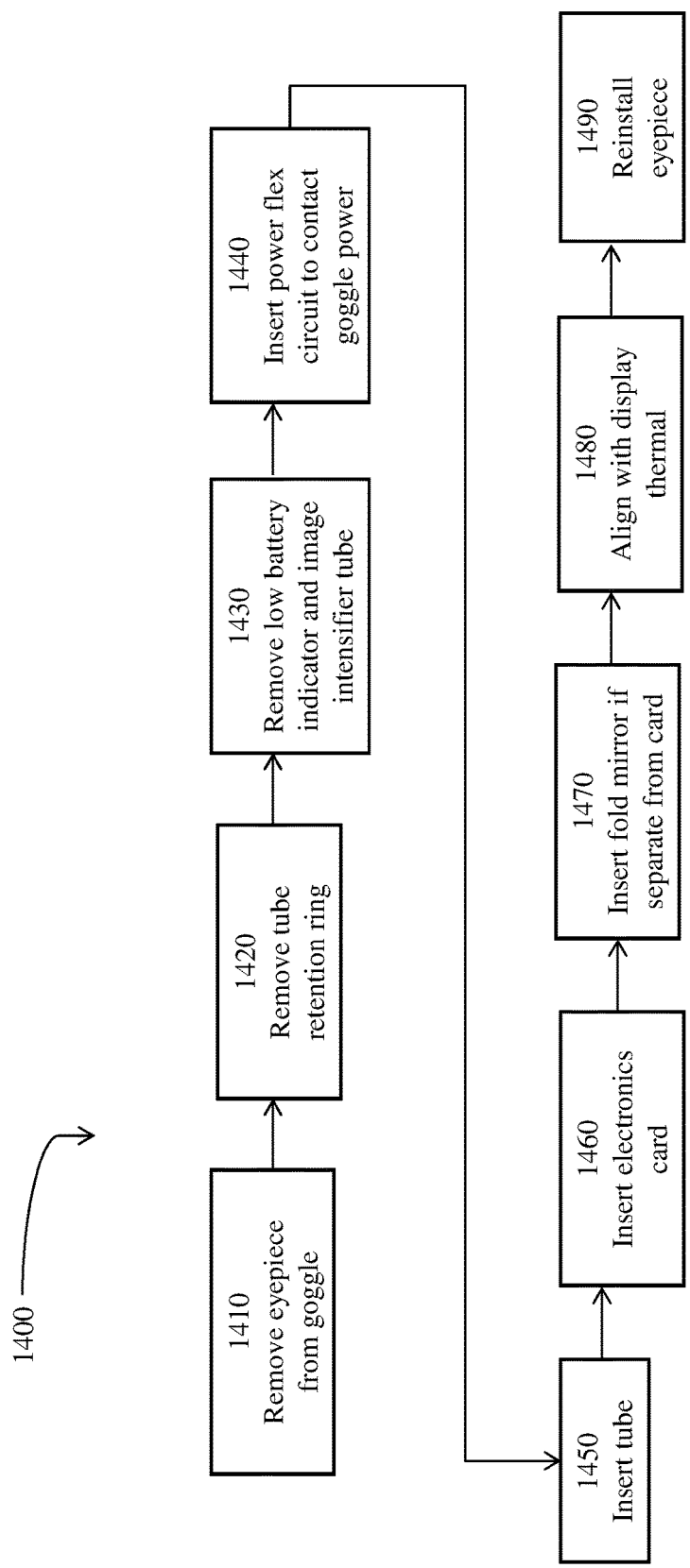
FIG. 14 is an exemplary flowchart with typical steps involved in retrofitting a night vision goggle with the exemplary optical assembly.

The exemplary version of FIG. 2 is a (retrofittable) optical assembly 100 that is inserted into an I2 goggle located between the image intensifier tube 110 and the eyepiece 108, and is mounted on a tube surface 132 mechanically held by the side walls of the goggle body 134. For use as a retrofit kit, reference is made to FIG. 14. To effect the retrofit (1400) in common night vision goggles, the eyepiece is removed from the goggle (1410), as are the tube retention ring (1420) and low battery indicator and image intensifier tube (1430). If the goggle has a light pipe, it is removed as well before the image tube is removed. To install the kit, the power flex circuit is inserted into the goggle so as to contact the power source of the goggle (1440) by pressing the flex against the power contacts. The intensifier tube (1450), electronics card (1460), and fold mirror (if separate from the electronics card) (1470) are also inserted. The optical assembly is thus inserted into the goggle and placed on the output of the tube. If the mechanical mounting features are independent of the electronics card these are now reinstalled. Optical alignment between the I2 and thermal channel may be made at this point. The fold mirror is aligned with the display of the thermal detector (1480) and the eyepiece is replaced (1490) on the goggle.

Figure 3:
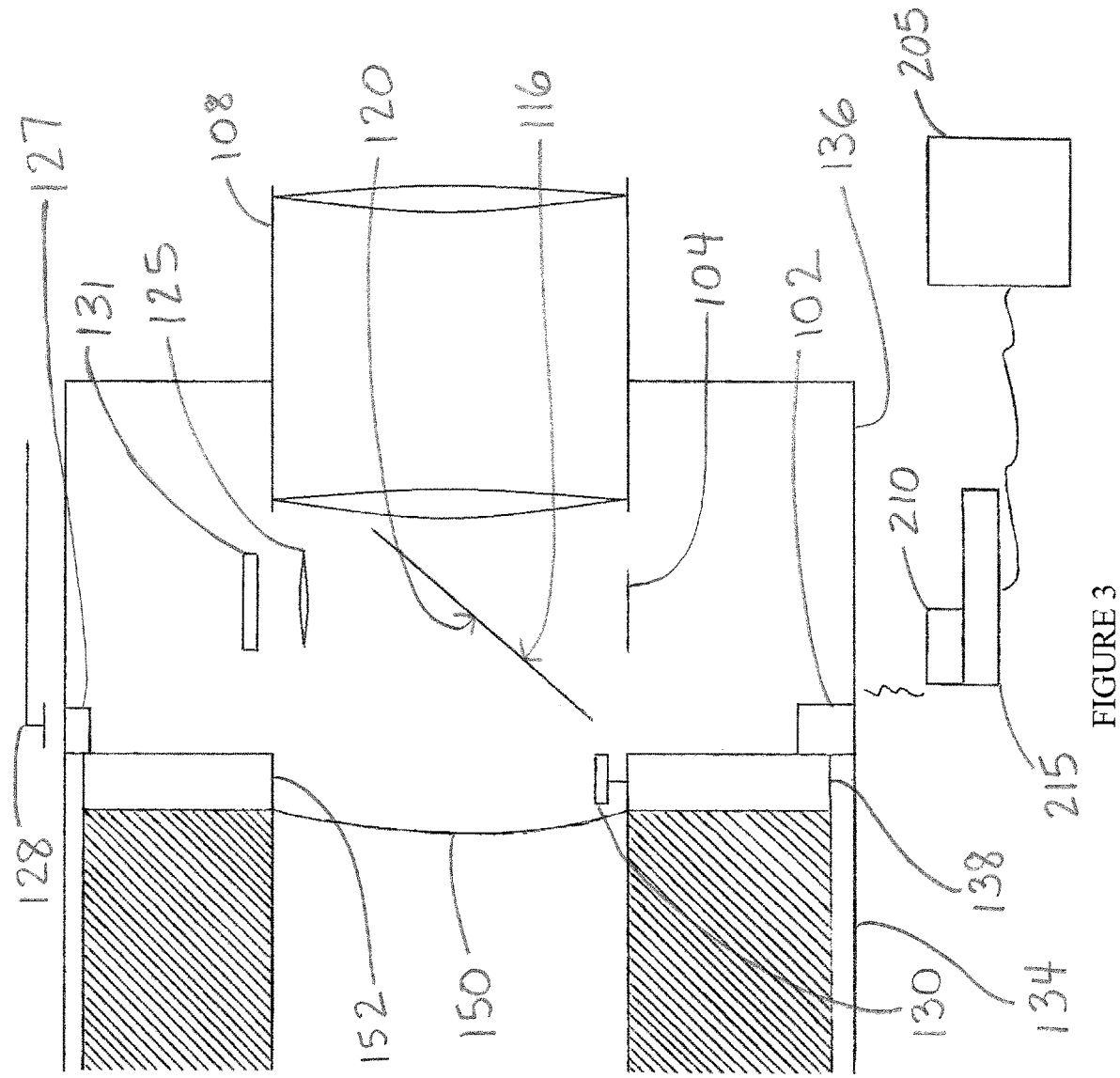
FIG. 3 depicts the use of wireless communication in general in an exemplary optical assembly.
Figure 4:
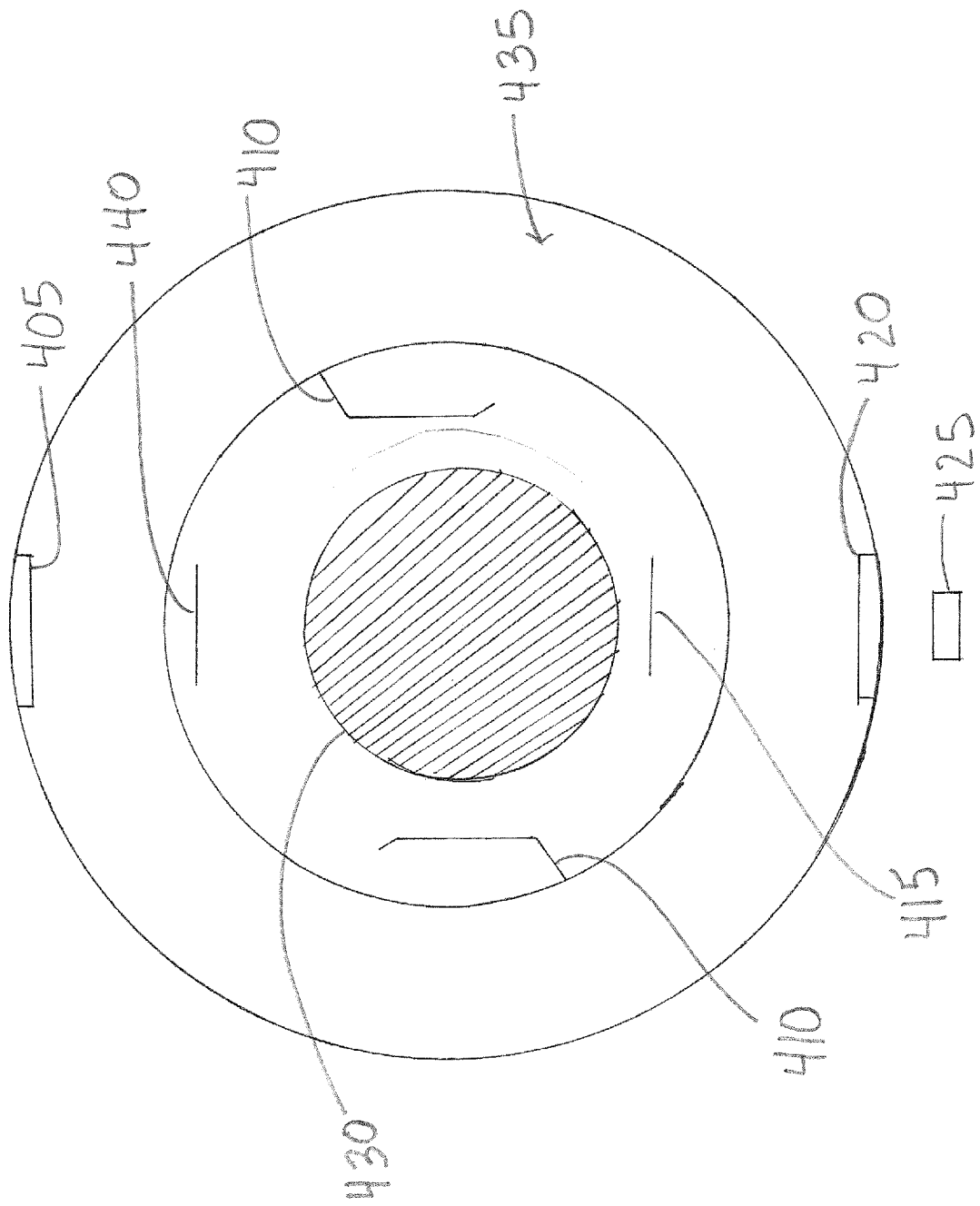
FIG. 4 is an end view of an exemplary insert in night vision goggles with eyepiece removed, showing a wireless transceiver 405, mirror mounts 410, display 415, wireless receiver 420, wireless transmitter 425, tube screen 430, tube envelope 435, and camera 440.

The optical assembly 100, shown close up in FIG. 3, includes a plastic frame 136 that holds display 104, thin fold mirror 106, and CMOS or CCD camera sensor 131. The frame 136 may also contain an electronics card 138; the plastic frame 136 can be mounted on the electronics to make the electronics card 138 a mechanical member for the optical assembly 100. The electronics card 138 preferably has one or more I/O section(s) for communicating through the goggle body using one or more of the non-contact communication mechanisms (further discussed below). For importing imagery into the goggle from (for example) a thermal channel 205, such as a clip-on on thermal imager, the thermal channel 205 has a wireless transmit unit 210 and an electronics card 215. The wireless transmit unit 210 may be placed physically opposite the receiver 102 for best signal transfer to help implement (for example) an electro optical method or capacitively coupled method of communication (further discussed below); a small pigtail ("to thermal camera") may be needed to route the signal to the proper location on the goggle body. If an RF method is used for the wireless transmission (see FIG. 6) and the power is low enough, the wireless transmission can be made through the goggle body to the receiver, making the pigtail unnecessary.

For the CMOS/CCD camera output, the order is reversed, i.e. the transmitter 127 is inside the goggle whereas the receiver 128 is exterior to the goggle body. This output can be routed to a transmitter 129 on the helmet mount. A photo-detector 130 can be mounted proximal to the display 104 or tube output screen 150 to measure the tube output. The output of the photo-detector 138 is routed to a display brightness control loop so that the display brightness approximates or matches the tube brightness. Finally, a thin flex circuit is mounted to the electronics card 138 to receive power from the goggle.

Figure 5:
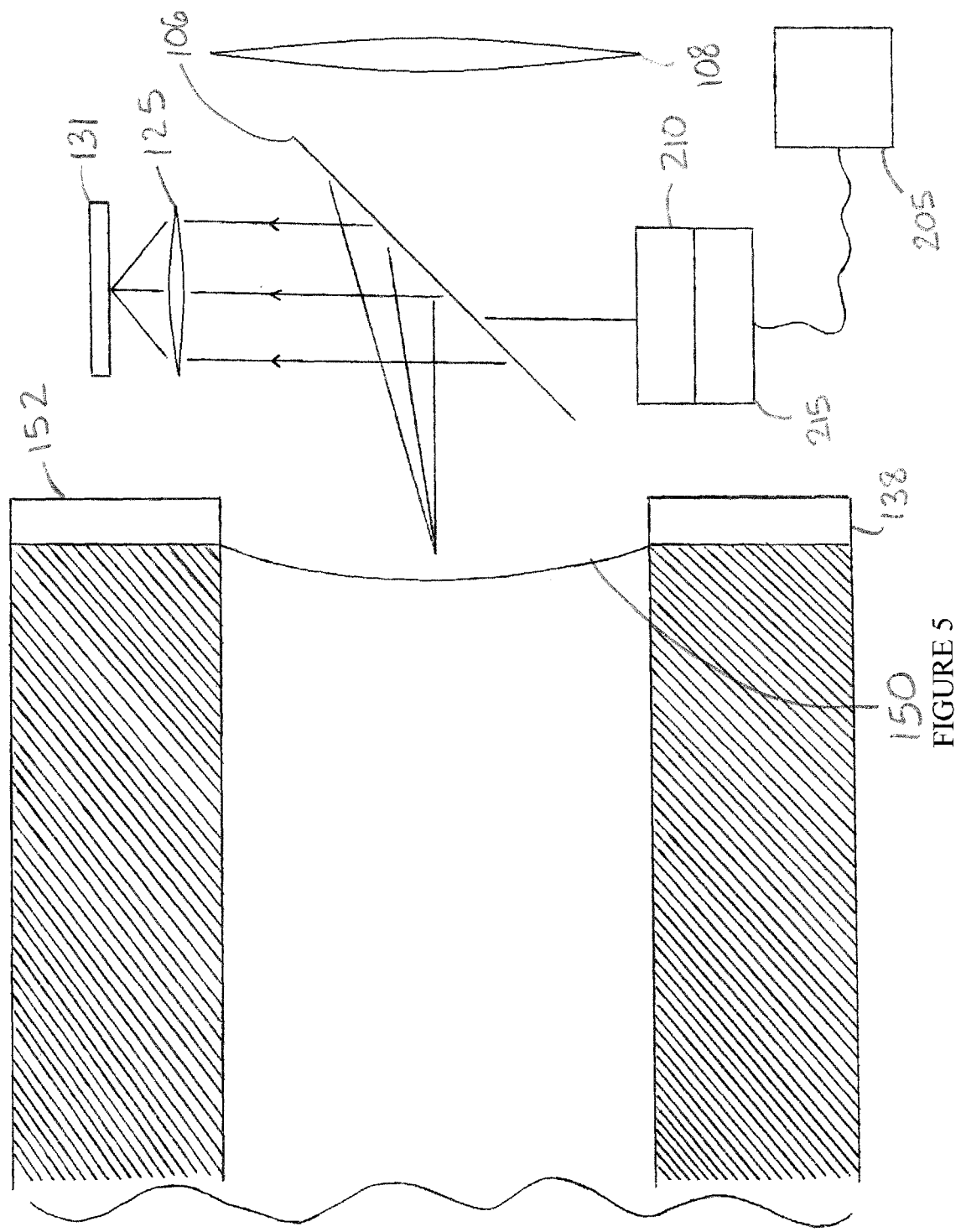
FIG. 5 represents the use of a fiber optic extender for the display for maintaining focal position in an exemplary optoelectronic device.

Optically, the frame holds the display 104 and camera 122 in the same focal plane as the output of the image intensifier tube 110. As an insert kit, the optical assembly 100 can be free to rotate about the optical axis for angular alignment of the display 104 and camera 122 to the I2 imagery. (It is also free to be inserted and removed without major disassembly of the goggle.) Rotational alignment can be accomplished by one of at least two means: (1) the mirror/display/camera assembly can be rotated relative to the electronics card as power and signals can be provided by a thin flex circuit; or, preferably, (2) the whole optics and electronics card can be rotated in the goggle body. This is in contrast to prior art goggles in which components are part of the goggle, in which case alignment takes place in the manufacturing process; this adds costs and increases production and yield risks. When components are part of an insert, those risks do not come into play. The flexibility of rotation allows both the display and camera to be located optically in the proper place, while at same time permitting the display or the camera to be located so there is no physical interference with the eyepiece. If, for particular goggles, this flexibility does not permit installation without interference, the display or camera may optionally have a fused fiber-optic bundle attached thereto to permit physical relocation of the component while maintaining the proper optical location (as depicted in FIG. 5). The optical principle that the display and tube output must be the same distance from the mirror is also shown in FIG. 5, but this principle does not apply to the camera and lens.

Figure 8:
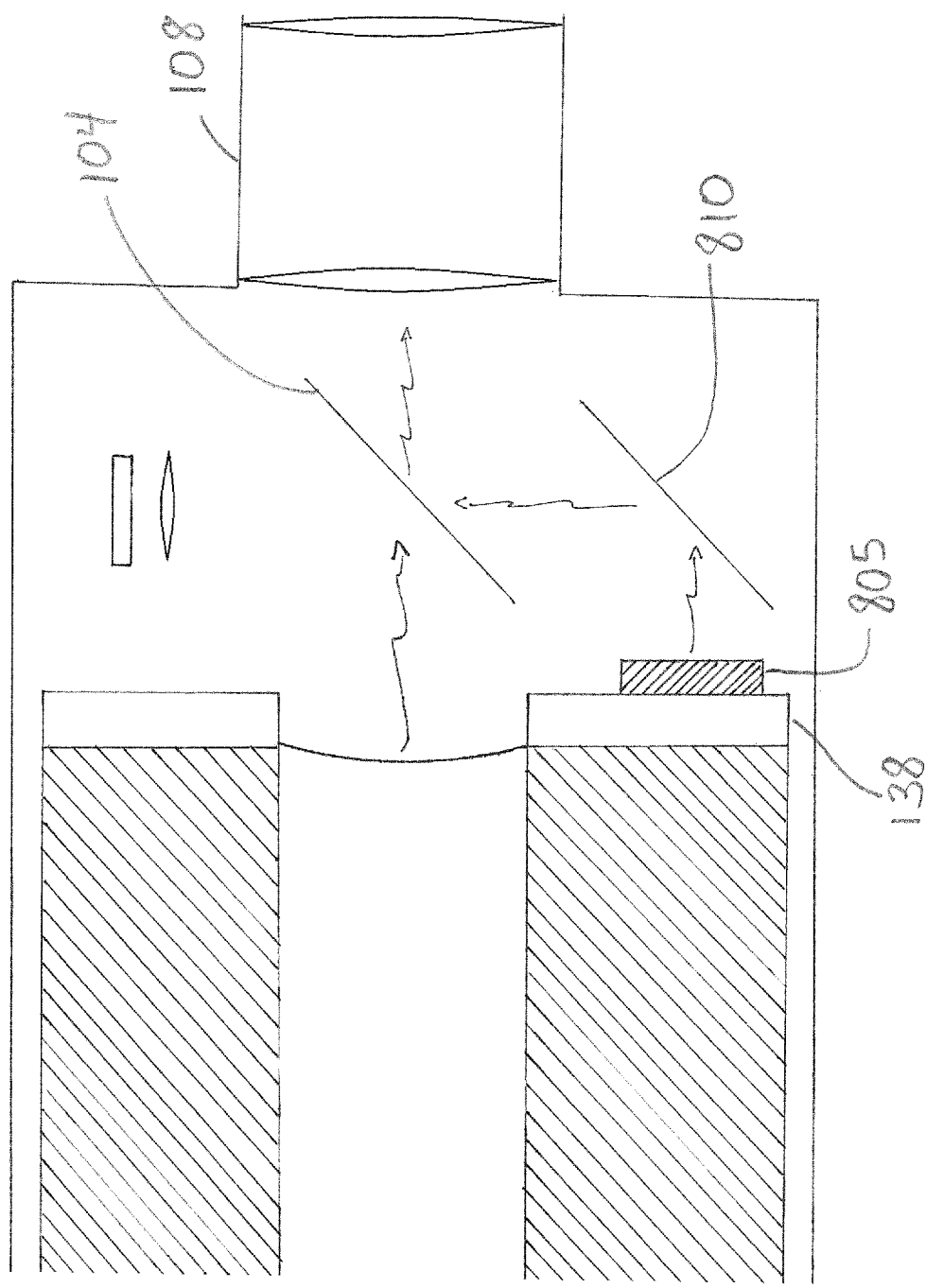
FIG. 8 depicts the use of two fold mirrors with a display that is secured to an electronics card in an exemplary optoelectronic device.

In illustrated versions, the display is shown to be located 90 degrees relative to the electronics card. While this may be desirable from an optics perspective, it might not be desirable from a display electronics card manufacturing perspective for certain designs, depending on goggle constraints. It thus may be desirable to mount the display flat on the electronics card. To properly present the display image to the eyepiece, an additional fold mirror can be placed over the display to bend the image 90 degrees. FIG. 8 illustrates the use of a second fold mirror 805 along with the main fold mirror 104 in relation to the eyepiece 108. As an additional alternative, a 90-degree fiber optic can be bonded to the display (not pictured). In either case, the display is optically rotated 90 degrees to present the image properly to the fold mirror and eyepiece.

The non-contact communications of the optical assembly can involve any electromagnetic wireless technology involving, for example, radio signals, light, magnetic or electric fields, the use of sound, etc. This includes, but is not limited to: 1) optically by, for example, taking advantage of the transmissive properties of plastic; 2) electrically via capacitive or inductive pick-up; and/or 3) radio (RF) communication. Because the display receives an input from the exterior thermal channel and the CMOS/CCD camera exports to the exterior, the communications links are effectively functionally identical: each has a send and receive through the goggle body. For these communication methods, wavelengths/frequencies should be chosen such that each transmit/receive channel will not interfere with other channels.

Regarding the first method (optically taking advantage of the transmission properties of the plastic materials of the goggle body), reference is made to FIG. 3. Here, the sending unit/camera transmitter 127 is a photodiode (LED) that emits light and a photo sensor, such as a phototransistor, is the wireless receiver 128. The photodiode 127 can be mounted to the electronics card 152, and is electrically connected to the display circuitry. The wavelength is chosen to be in a transmission region of the plastic part of the goggle body. There is much flexibility in the sources and receivers that can be used, as long as the fundamental principle of choosing a wavelength to which the goggle body is transmissive is followed. Likewise, the receiver is 128 chosen to sense the emission wavelength of the source. Most plastics have transmissive windows in the near infrared, so a 1.55 micron LED, such as Edmund stock number 5-73, might be suitable in many cases. This diode could be incorporated into the thermal camera, and would transmit into the goggle body where the matching receiver is on the electronics card. The photodiode 127 would also be attached to the electronics card to send the CMOS/CCD video through the goggle body. The match receiver would then be selected and respectively mounted on the electronics card and goggle to receive the signal from the LED. If necessary, a minor modification to the goggle body could be made if the goggle body is not transmissive, such as for a goggle body made of aluminum or high carbon Ultem plastic. The modification would involve forming an aperture (by, for example, drilling a hole) and securing a transmissive window (using, for example, glue or other suitable securing means). The transmissive window would be shaped to the form of the goggle body and be large enough to permit angular rotation of the insert for rough alignment.

To use this method, the exterior unit should be optically aligned with the interior source. The thermal camera receiver can be mounted on a "pig tail" that runs to the rest of the thermal camera assembly, which contains the thermal lens, detector, and image processing subsystem. The pigtail can be mounted to the monocular via (for example) a Velcro strip or something with similar functionality. To align with the photo-sensing section of the optical assembly, both the I2 channel and thermal channel are turned on. The pigtail is then moved by the operator until video signal is displayed. Video signal will be displayed when the photo source picks up the signal from the pigtail. It is noted that the thermal channel "sends" and the display assembly "receives," while with the video camera, the opposite will occur.

Figure 6:
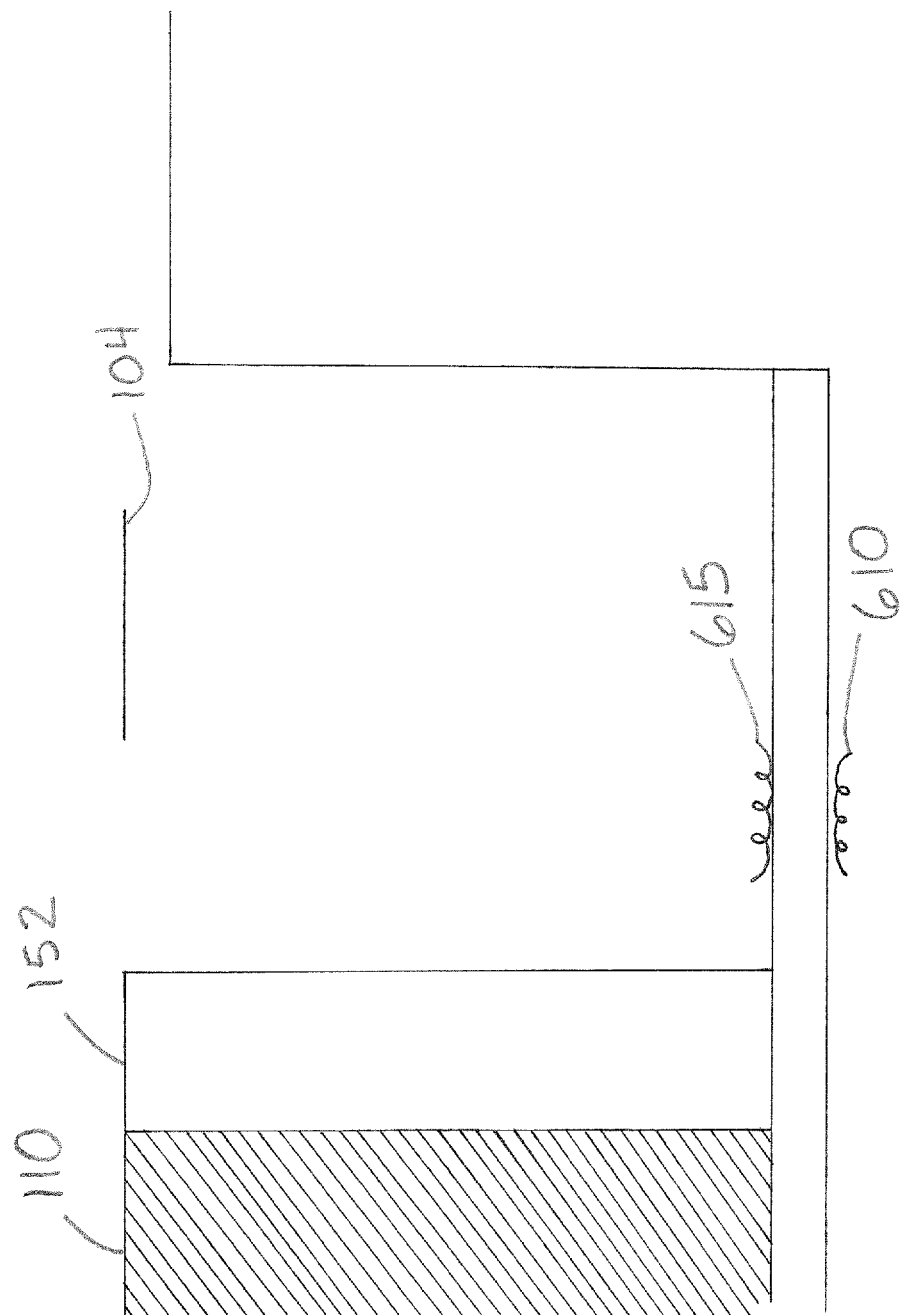
FIG. 6 represents the use of radio frequency wireless communication in an exemplary optoelectronic device.
Figure 7:
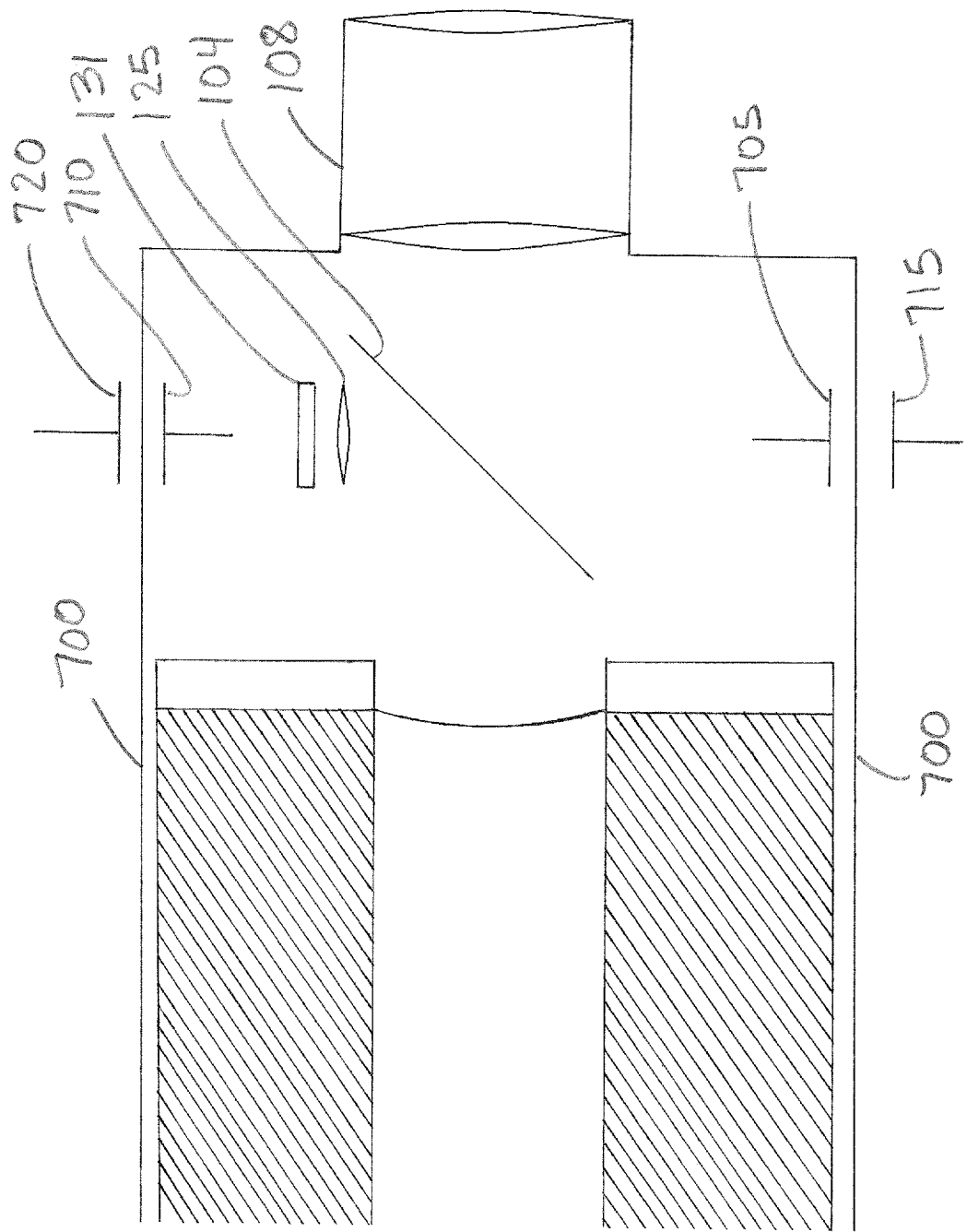
FIG. 7 represents the use of capacitively coupled wireless communication in an exemplary optoelectronic device.

The capacitive pick up/inductive pick-up and RF communication approaches all function in a similar manner and are represented in FIGS. 6 and 7, respectively. A send and receive function occurs on each side of the goggle plastic body, with the source and receiver able to be aligned manually by movement of the exterior component. In FIG. 6, the RF approach can involve incorporation of low power RF send 610 and receive 615 circuits into the electronics card. For example, a Bluetooth sending unit can be incorporated in the clip-on thermal channel and a Bluetooth receive unit can be incorporated in the electronics card. Referring to FIG. 7, the capacitive pick up method, as a special case of external communication, takes advantage of the dielectric properties of the goggle body 700. A common type of capacitor is composed of a dielectric sandwiched between two metal plates. A conductive plate or button such as copper film 705, 710 can be attached to the interior of the goggle body. The goggle body would function as the dielectric. A similar conductive film 715, 720 is placed on the exterior of the goggle body opposite the interior conductor. Thus the goggle behaves as a capacitor. When a video signal is applied to one plate the signal appears on the other plate. Size and materials can be chosen as found suitable for the particular application.

Figure 9:
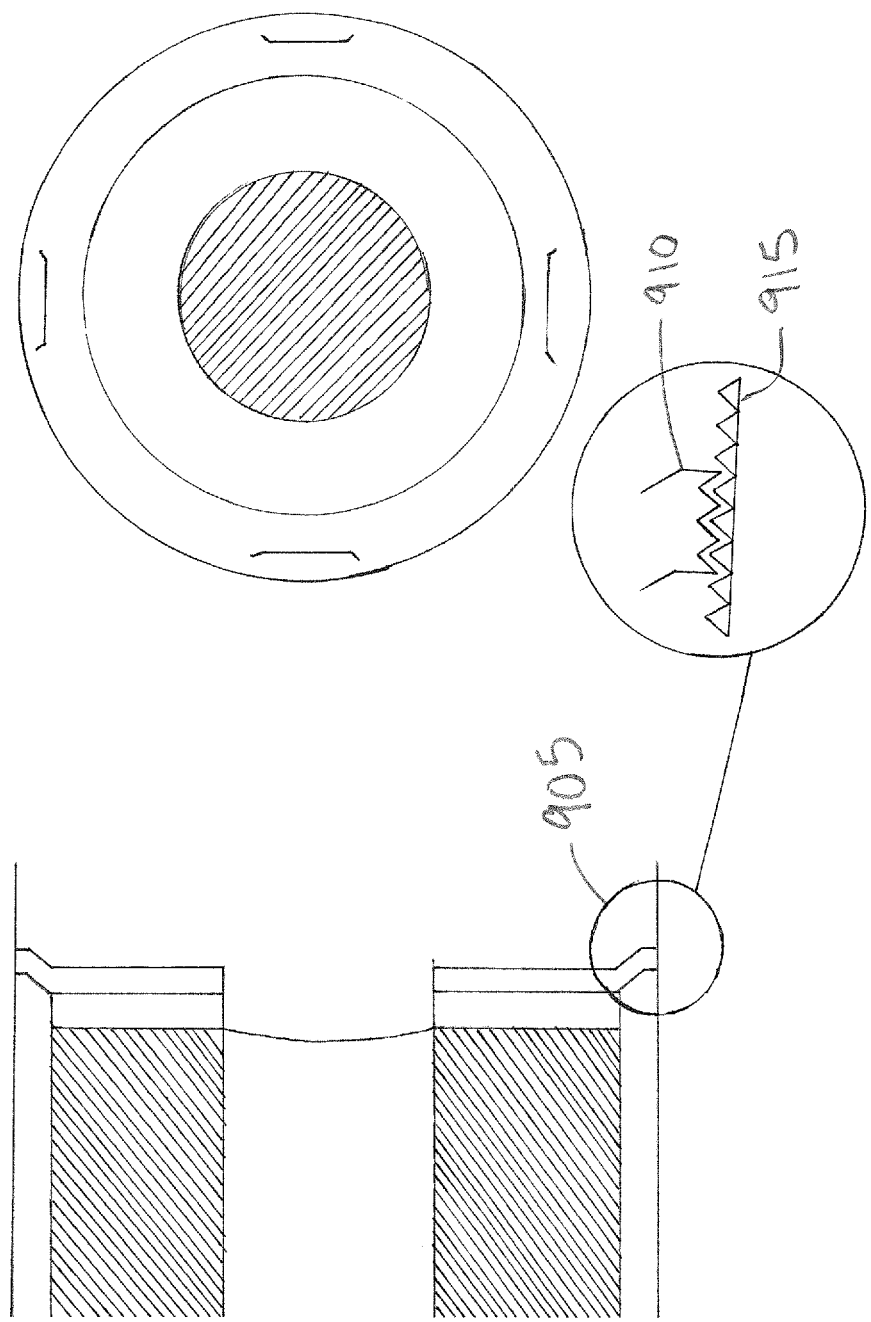
FIG. 9 depicts an exemplary snap fit retention mechanism for mounting the exemplary optical assembly in an optoelectronic device.

Mechanical assembly can be accomplished via a friction fit of the plastic optical frame with the goggle body. The primary intent would be to use the threaded ring that is already used to retain the tube in the goggle. However, if insufficient thread length exists, other means can be employed, such as a reverse dagger snap fit 905, as depicted in FIG. 9, or simply a press fit. In FIG. 9, a retaining ring and four threaded fingers 910 snap into the existing retaining ring threads 915. The optical assembly is an annular cartridge containing a frame for holding the fold mirror, display, and/or camera. Optionally, the frame may hold the circuit card; the circuit card could also be sandwiched between the back of the tube and the optical frame. If the frame holds the circuit card, the frame has a series of mounting ridges. Upon insertion and rotational alignment, the eyepiece is replaced onto the goggle body. For operation with a thermal channel, the thermal channel can be secured to the goggle and the sending unit aligned with the receiving unit by simply adjusting to maximize the signal. For video output the same sort of alignment takes place. The goggle may then be put in service.

As suggested above, a photo detector can be placed in the output path from the image tube to control the output brightness of the tube and thermal channel. The photo detector could directly measure the tube brightness and provide a signal to the display electronics that are on the electronics card. The detector may be mounted by the tube or placed after the mirror, as deemed suitable. This provides at least two advantages. First, the tube power supply does not need to be modified, and second, the thermal camera can be completely cut out of the control loop. The video receiving section then transmits camera imagery either by wire or wirelessly to a recorder or display. Both the output section of the thermal channel, or the video receiving unit, transmit and receive to the optical assembly without modification of the goggle, as already suggested. The optical assembly can also be mounted internally to the goggle body, as discussed below.

Providing the optical assembly with electrical power is very advantageous for a versatile retrofit into a goggle. Power can be obtained from the existing power contacts. In presently-fielded goggles, the contacts are commonly leaf spring contacts or "pogo" pin contacts. Both methods make electrical contact to the tube power supply by pushing down on the matching contact on the tube. Electrical contact could be made by sandwiching a thin flex circuit between the tube and the spring contacts. The flex circuit would have exposed contacts on both sides so that the spring pins would push against the flex providing power to the circuit card and push the flex against the tube so that power is supplied by the tube.

In exemplary versions, the mirror surface can be provided with a neutral density coating to achieve a uniform spectral reflectance of a white output from the display. A notch filter is used where the transmission on the tube optical path is around 90% in the peak wavelength of the tube and zero elsewhere. In the display channel, the reflectance is zero at the wavelength of the tube and around 90% in all other wavelengths. As a consequence the visual imagery of the goggle is not reduced. Thus performance metrics such as resolution, modulation transfer function (MTF), range detection, and reliability are not significantly degraded. The small amount of light removed from the display channel does not significantly impact the white output. Application of such a filter to a night vision goggle in the tube output train is one of the inventive aspects of exemplary versions of the invention.

FIGS. 10-13 depict alternative exemplary methods of transmitting the display image into the eyepiece optical path so that an observer can simultaneously view another image source such as an image intensifier tube. This method optically projects image from a display 1005 so that it appears to be approximately coincident with the image intensifier tube image plane. A light pipe 1010 translates the image by internal reflection. In the case of a diffractive element as shown, the display is mounted on flat on its circuit card which is then mounted flat on the tube. A diffractive optical element 1015, 1015A, 1015B bends the entrance light in such a manner that the image is translated along the light pipe unit it is in the position for exitance. Another diffractive optical element 1020, 1020A, 1020B is located to rebend the light for exitance. One alternative to the light pipe 1010 is to use a dove prism instead of a diffractive as deemed suitable in particular applications.

Figure 10:
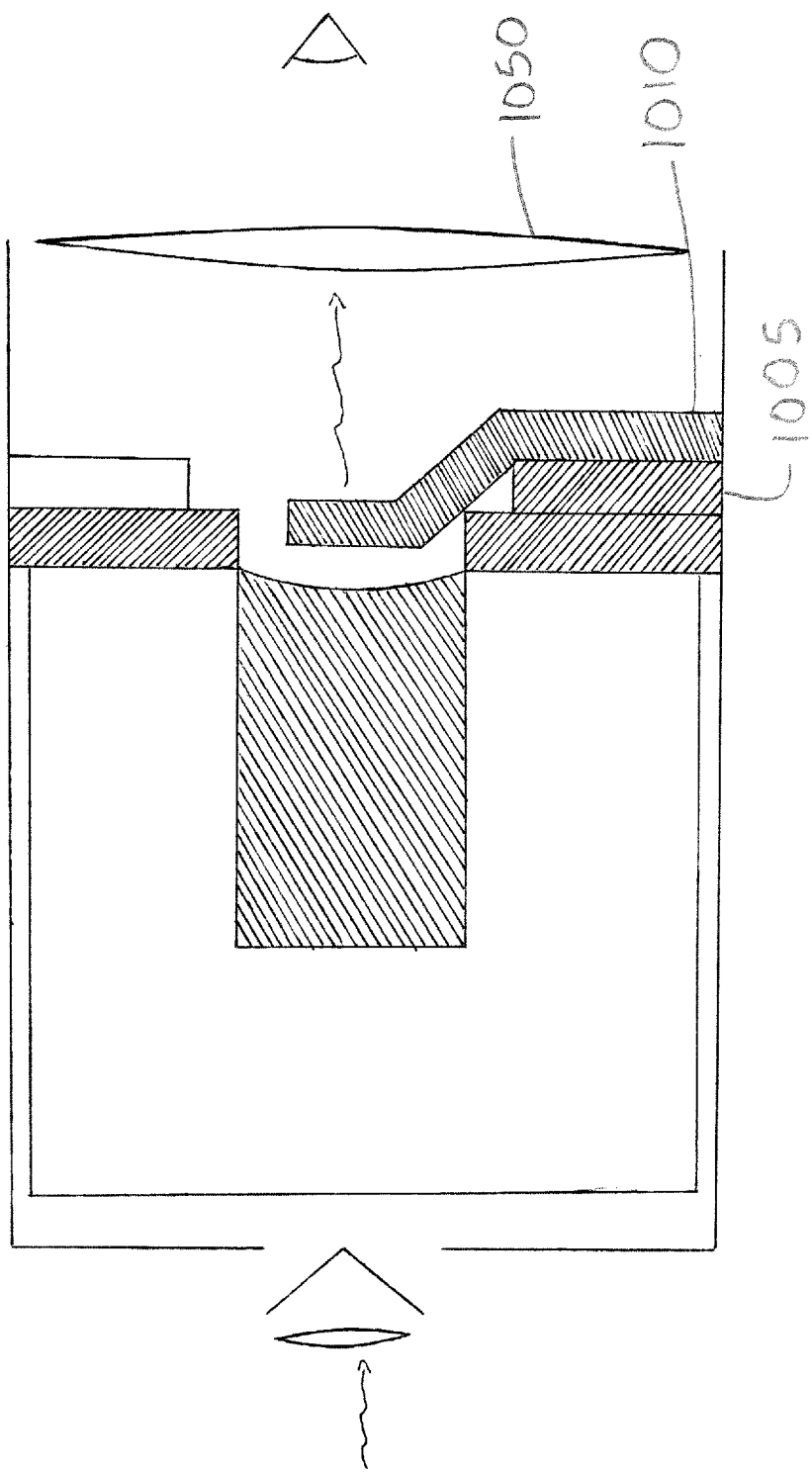
FIG. 10 depicts an exemplary diffractive optical element in an optoelectronic device.
Figure 11:
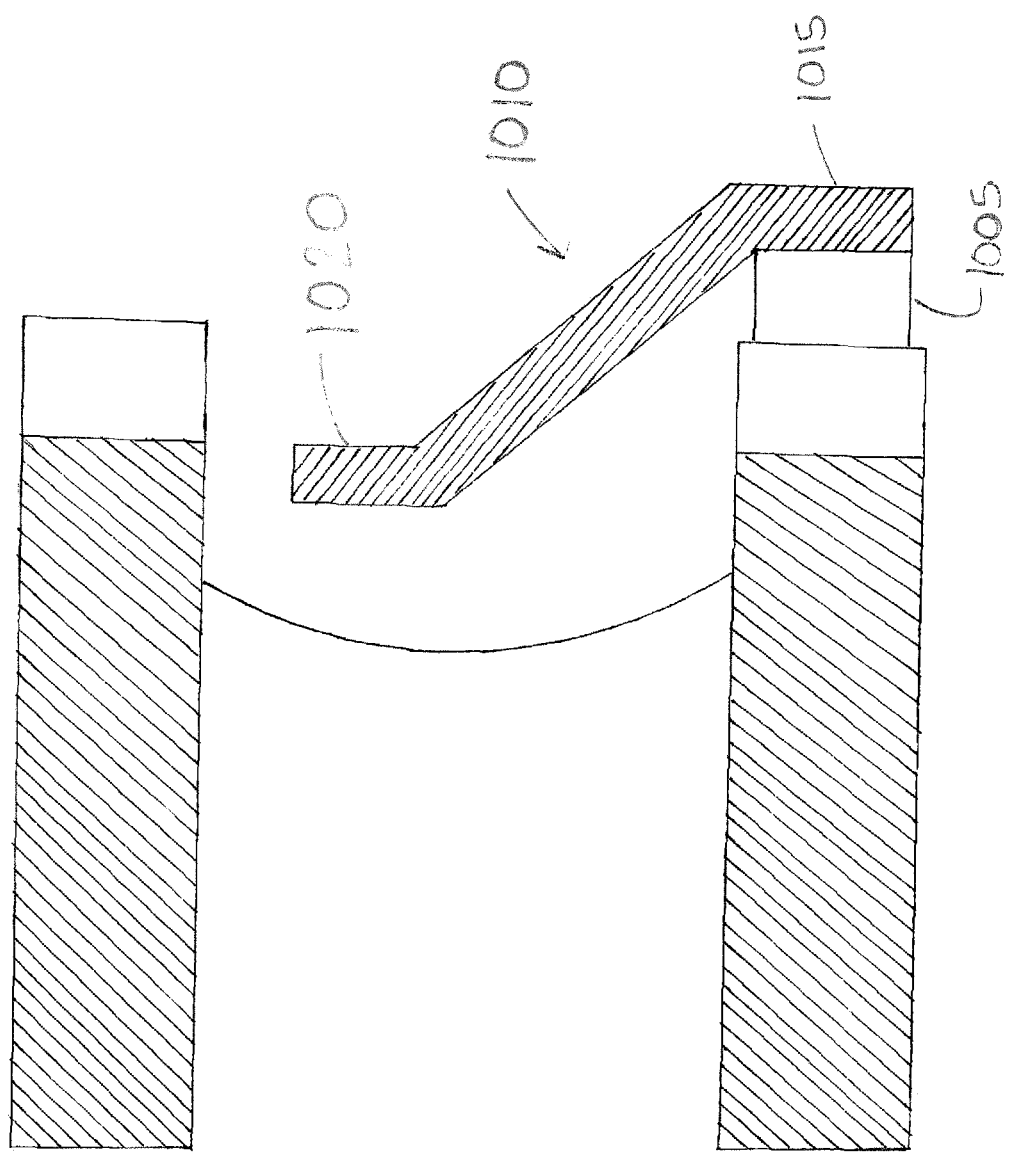
FIG. 11 is a close-up view of the exemplary diffractive optical element of FIG. 10.
Figure 12:
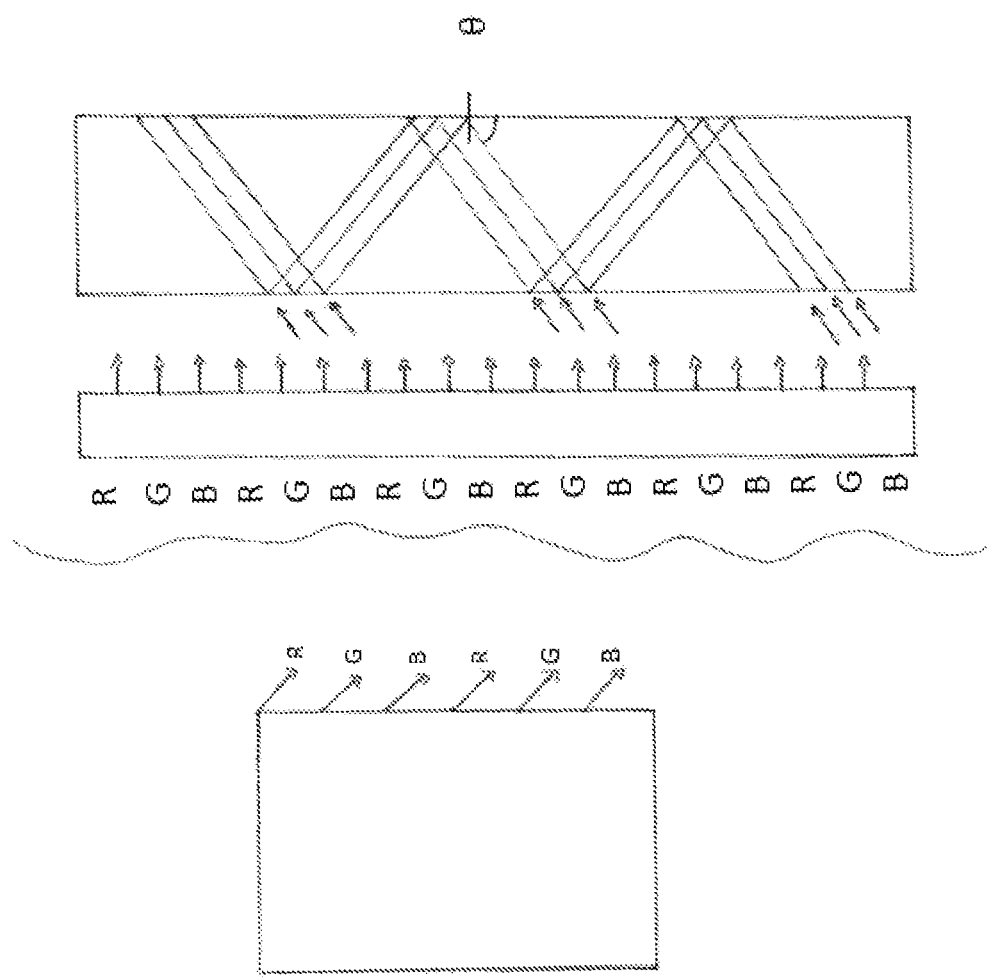
FIG. 12 depicts design details of exemplary diffractive elements that match RGB of the display.
Figure 13:
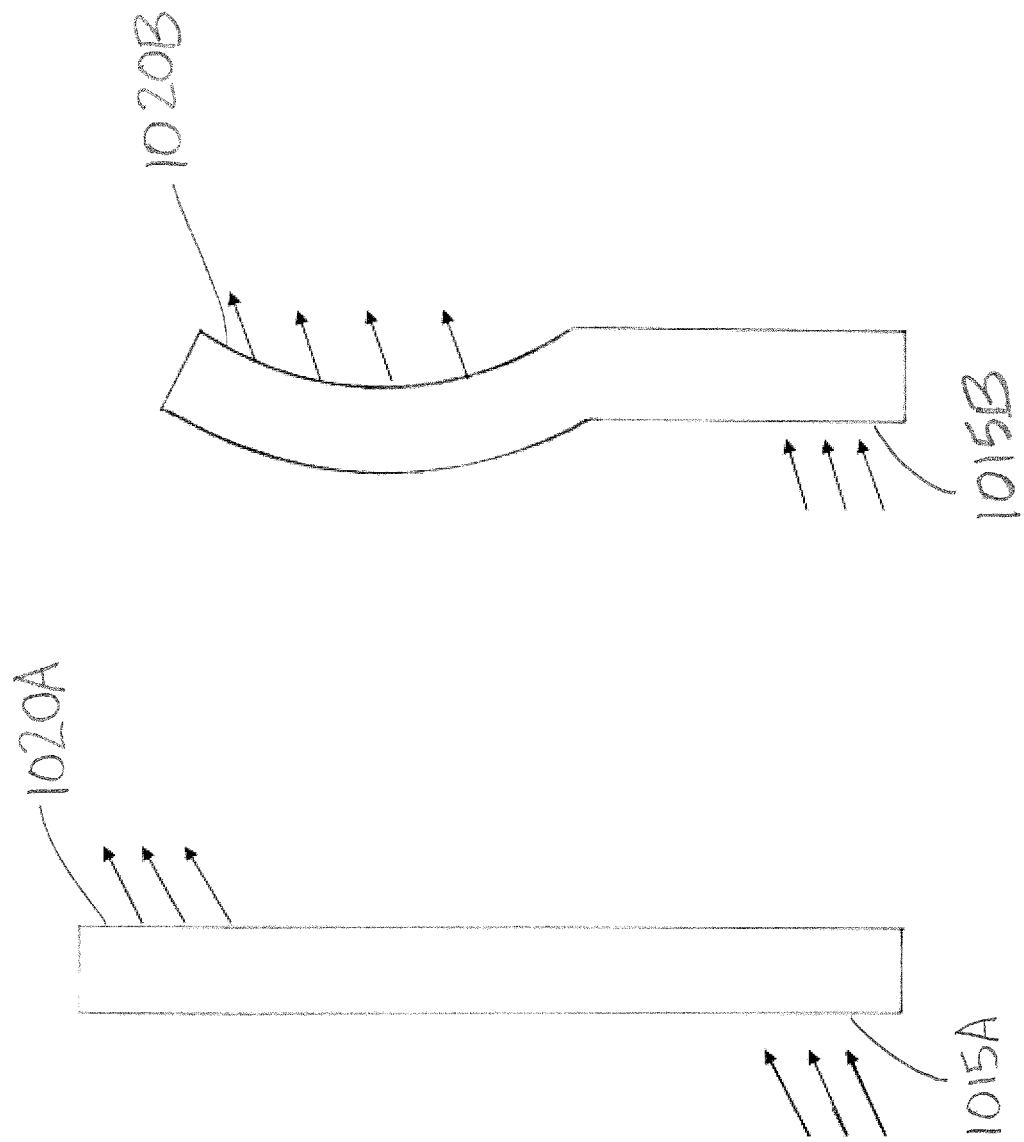
FIG. 13 shows exemplary flat and curved diffractive elements that could be used in the optoelectronic device of FIG. 10.

Referring in particular to FIGS. 10 and 11, an input diffractive element 1015 is included on the entrance face of a flat piece of optical glass 1010. That is, the diffractive surface is placed as an input on the glass. The input diffractive element 1015 bends the light from the display 1005 at such an angle that image is transmitted to the output by total internal reflection (TIR). Preferably, to help maximize efficiency, the diffractive surface is matched to each of the color centers in the display, as illustrated in FIG. 12. The image is then transmitted to the center of the tube by total internal reflection. The surfaces of the optical element thus should be optically parallel. Finally, an output diffractive surface 1020 is placed on the output of the element. This diffractive surface breaks up total internal reflection and thus allows the light to exit the element to be observed through the eyepiece 1050. The output diffractive may be placed on the surface closest to the tube image plane, in which case it functions in reflection mode, or on the surface farthest away, where it acts in transmission mode. Either may be suitable depending on the application, and the selection can be based on efficiency and how close the tube and display image planes must be with respect to each other.

The optical glass can have different configurations. For example, the glass can be stepped so the display image is very close to the tube output, as shown on the left side of FIG. 13, or it can be stepped with a curvature to match the tube output, as shown on the right side of FIG. 13. The output glass can also be made circular so there is no line of demarcation between the intensified and displayed image.

Preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

What is claimed is:
1. An optoelectronic device comprising:
an eyepiece;
an image tube;
an optical assembly including:
  a non-contact receiver for receiving a first image,
  a display for displaying the first image received via the receiver, and
  a brightness detector;
wherein the optical assembly is positioned between the eyepiece and the image tube,
wherein a second image is output from the image tube,
wherein the optical assembly is configured to adjust a brightness level of the display based on brightness of the second image,
wherein the optical assembly superimposes the first image with the second image, the first image being received via the non-contact receiver, the second image being generated by the optoelectronic device in which the optical assembly is located,
wherein the first image is generated by a second optoelectronic device that is separate from the optoelectronic device in which the optical assembly is located, such that the first image from the second optoelectronic device and the second image from the optoelectronic device are superimposed for viewing through the eyepiece.

2. The device of claim 1, further comprising a device body which houses the eyepiece, the image tube, and the optical assembly.

3. The device of claim 2, wherein at least part of the device body is transparent to a transmission medium.

4. The device of claim 3, wherein the transmission medium is optical and the body is transparent.

5. The device of claim 3, wherein the transmission medium is electrical and the body is a capacitor dielectric.

6. The device of claim 3, wherein the second optoelectronic device comprises a radiofrequency (RF) transmitter and the transmission medium is RF waves.

7. The device of claim 6, wherein the radiofrequency transmitter is connected to the body by a pigtail.

8. The device of claim 1, wherein the optical assembly further comprises a frame to which are mounted the non-contact receiver, the display, and the brightness detector.

9. The device of claim 8, wherein the frame holds the display in the same focal plane as the second image.

10. The device of claim 8, further comprising an at least partially reflective optical element that is mounted to the frame.

11. The device of claim 8, further comprising an electronics card that is connected to the frame.

12. The device of claim 1, further comprising an at least partially reflective optical element that is positioned in the path of light from the display.

13. The device of claim 12, wherein the at least partially reflective optical element is a fold mirror with a notch filter.

14. The device of claim 12, wherein the at least partially reflective optical element is located on an electronics card.

15. The device of claim 1, wherein the optical assembly further comprises a camera having an associated camera transmitter capable of transmitting the first image superimposed with the second image.

16. The device of claim 1, wherein the second optoelectronic device is a thermal imaging camera.

17. A method of retrofitting an optoelectronic device comprising:
    removing an eyepiece from the optoelectronic device;
    removing an image intensifier tube from the optoelectronic device;
    inserting a power circuit into the optoelectronic device;
    inserting the image intensifier tube into the optoelectronic device;
    inserting an electronics card into the optoelectronic device;
    inserting an optical assembly into the optoelectronic device such that the optical assembly is positioned between the eyepiece and the image tube, the optical assembly including:
        a non-contact receiver for receiving a first image generated by a second optoelectronic device that is separate from the optoelectronic device in which the optical assembly is located,
        a display for displaying the first image received via the receiver, and
        a brightness detector, wherein the optical assembly is configured to adjust a brightness level of the display based on brightness of a second image output from the image tube; and
    inserting the eyepiece into the optoelectronic device such that when the optical assembly superimposes the first image with the second image, the first image being received via the non-contact receiver, the second image being generated by the optoelectronic device in which the optical assembly is located, the first image from the second optoelectronic device and the second image from the optoelectronic device are superimposed for viewing through the eyepiece.

18. The method of claim 17, further comprising rotating the optical assembly about the optical axis for angular alignment of the optical assembly to the image intensifier tube.

19. The method of claim 17, further comprising at least one electronics card before inserting the eyepiece.

20. The method of claim 17, further comprising inserting an at least partially reflective optical element in the path of light from the display before inserting the eyepiece.

* * * * *